United States Patent [19]

Smith, Jr. et al.

[11] 3,743,875

[45] July 3, 1973

[54] POLYPHASE SYNCHRONOUS ALTERNATORS HAVING A CONTROLLED VOLTAGE GRADIENT ARMATURE WINDING

[75] Inventors: Joseph L. Smith, Jr., Concord; James L. Kirtley, Jr., Boston, both of Mass.

[73] Assignee: Massachusetts Institute of Technology, Cambridge, Mass.

[22] Filed: July 26, 1971

[21] Appl. No.: 166,083

[52] U.S. Cl. .................. 310/198, 310/201, 310/205

[51] Int. Cl. .......................................... H02k 19/00

[58] Field of Search ................ 310/10, 40, 52, 198, 310/196, 201, 202, 203, 204, 205, 206, 207, 156, 162; 320/47, 49, 67

[56] References Cited

UNITED STATES PATENTS

| | | | |
|---|---|---|---|
| 3,621,311 | 11/1971 | Van Strack | 310/207 |
| 3,601,642 | 8/1971 | Willyoung | 310/202 |
| 2,371,193 | 3/1945 | Sigmund | 310/43 UX |
| 3,152,273 | 10/1964 | Harrington | 310/198 |
| 3,201,627 | 8/1965 | Harrington | 310/198 |
| 3,152,273 | 10/1964 | Harrington | 310/202 |
| 2,745,029 | 5/1956 | McElligott | 310/202 |
| 3,476,964 | 11/1969 | Willyoung | 310/198 |
| 2,015,562 | 9/1935 | Kilgore | 310/202 |
| 3,440,456 | 4/1969 | Grunwald | 310/10 |
| 3,188,377 | 7/1965 | Hughes | 310/201 |

*Primary Examiner*—R. Skudy
*Attorney*—Arthur A. Smith, Jr., Martin M. Santa et al.

[57] ABSTRACT

Polyphase synchronous alternators are described in which the armature conductors are wound to have a small voltage difference between most adjacent windings so that the conductors need to be insulated for this voltage. Regions of the armature winding where larger voltage differences exist are provided with additional insulation. The armature cross-section contains substantially more copper relative to insulation than the conventional machine because of the reduced volume of insulation thereby increasing the economic terminal voltage of the machine. A cryogenic field winding produces the required magnetic flux without requiring armature teeth in which the armature conductors are placed as in a conventional machine.

29 Claims, 42 Drawing Figures

Patented July 3, 1973 3,743,875

INVENTORS:
JOSEPH L. SMITH, JR.
JAMES L. KIRTLEY, JR.
BY [signature]
ATTORNEY

INVENTORS:
JOSEPH L. SMITH, JR.
JAMES L. KIRTLEY, JR.
BY [signature]
ATTORNEY

INVENTORS:
JOSEPH L. SMITH, JR.
JAMES L. KIRTLEY, JR.
BY [signature]
ATTORNEY

INVENTORS:
JOSEPH L. SMITH, JR.
JAMES L. KIRTLEY, JR.
BY [signature]
ATTORNEY

INVENTORS:
JOSEPH L. SMITH, JR.
JAMES L. KIRTLEY, JR.
BY [signature]
ATTORNEY

INVENTORS:
JOSEPH L. SMITH, JR.
JAMES L. KIRTLEY, JR.
BY [signature]
ATTORNEY

INVENTORS:
JOSEPH L. SMITH, JR.
JAMES L. KIRTLEY, JR.
BY Martin M. Santa
ATTORNEY INVENTORS:
JOSEPH L. SMITH, JR.
JAMES L. KIRTLEY, JR.
BY [signature]
ATTORNEY INVENTORS:
JOSEPH L. SMITH, JR.
JAMES L. KIRTLEY, JR.
BY [signature]
ATTORNEY INVENTORS:
JOSEPH L. SMITH, JR.
JAMES L. KIRTLEY, JR.
BY [signature]
ATTORNEY INVENTORS:
JOSEPH L. SMITH, JR.
JAMES L. KIRTLEY, JR.
BY [signature]
ATTORNEY INVENTORS:
JOSEPH L. SMITH, JR.
JAMES L. KIRTLEY, JR.
BY [signature]
ATTORNEY INVENTORS:
JOSEPH L. SMITH, JR.
JAMES L. KIRTLEY, JR.
BY Martin M. Santa
ATTORNEY (b)

(a)

INVENTORS:
JOSEPH L. SMITH, JR.
JAMES L. KIRTLEY, JR.
BY [signature]
ATTORNEY

INVENTORS:
JOSEPH L. SMITH, JR.
JAMES L. KIRTLEY, JR.
BY Martin M. Santa
ATTORNEY INVENTORS:
JOSEPH L. SMITH, JR.
JAMES L. KIRTLEY, JR.
BY Martin M. Santa
ATTORNEY INVENTORS:
JOSEPH L. SMITH, JR.
JAMES L. KIRTLEY, JR.
BY [signature]
ATTORNEY

Patented July 3, 1973 3,743,875

INVENTORS:
JOSEPH L. SMITH, JR.
JAMES L. KIRTLEY, JR.
BY [signature]
ATTORNEY

POLYPHASE SYNCHRONOUS ALTERNATORS HAVING A CONTROLLED VOLTAGE GRADIENT ARMATURE WINDING

This invention relates to polyphase synchronous alternators and in particular to alternator construction which allows terminal voltages at least several times the maximum economic voltage possible with conventional methods. This invention is particularly applicable to synchronous machines with super-conducting field windings although it may be used with conventional field windings.

In conventional synchronous machines, the required magnetic field can be obtained economically only if the magnetic circuit is high permeability iron except for the small air gap between the rotor and stator. When superconductors are used for the field winding, the magnetic field can be obtained economically without the aid of ferromagnetic material.

In the conventional machine the armature (stator) conductors must be placed in slots in the stator iron so that the air gap can be kept small. The magnetic flux then is concentrated in the iron teeth between the conductor bars. Since the magnetic iron of the armature must be at one electric potential and the armature conductors are at the A. C. terminal voltage of the machine (with the phase of the voltage different for each of the three phase windings), each conductor must be insulated for the full terminal voltage of the machine.

In the machine with superconducting field windings the armature conductors do not have to be set in slots in the armature iron. Therefore the conductors need to be insulated only for the voltage between adjacent conductors. Only the external insulation of the winding needs to withstand the full terminal voltage. This invention is the concept of arranging the armature winding in such a way that the voltage between adjacent bars is a minimum so that the total volume of insulation in the winding is a minimum for a given terminal voltage. Since the maximum terminal voltage of the machine is in simplest terms an economic optimization of the ratio of insulation volume to conductor volume, the reduction in the required volume of insulation increases the economic terminal voltage.

The voltage difference between conductors will be minimum when the voltage is distributed in a continuous wave around the central axis of the three phase winding. As an example, this condition of a continuous voltage wave exists when the windings are delta connected and the windings are formed by connecting the adjacent turns in series.

The previous discussion applies to the active central section of the armature winding there the conductors interact with the magnetic field and space is at a premium. In the end turn sections of the winding the conductors are spread out radially so that the winding becomes about twice as thick in the radial direction. This radial spread is necessary to provide space for the conductor to turn circumferentially from the axis of the machine to go around to the opposite side. End turn connections require that the conductors in some of the different layers of the end-turn sections of the winding must turn in opposite directions. End-turn layers are classed "sub-layers." The voltage difference between the sub-layers in the end turns increases to full terminal voltage at the mid point of the end turn and then decreases to zero at the connectors at the extreme ends of the winding. The voltage difference between adjacent conductors in each sub-layer, however, remains low in the end turns. Thus, the end turns require additional insulation between sub-layers. This insulation can be provided by a cylindrical layer of insulation between the sub-layers of conductors which cross one another in the end turn region. This additional insulation in the end turns is not serious since the end turns are not in the main magnetic field and space for conductors is not at such a premium.

It is, therefore, an object of this invention to provide an alternator which will provide terminal voltages which are several times those economically possible in conventional alternators.

It is a feature of this invention that an armature is provided which has a controlled voltage gradient between its turns. It is a further feature of this invention that the active copper conductor occupies a greater fraction of the armature volume than in conventional machines because the armature conductors are not set in slots in the iron of the armature magnetic field structure and thus, do not require full terminal voltage insulation surrounding each conductor.

Other objects, features and advantages of this invention will become apparent from the following description taken in conjunction with the accompanying drawings in which.

Figure 26:
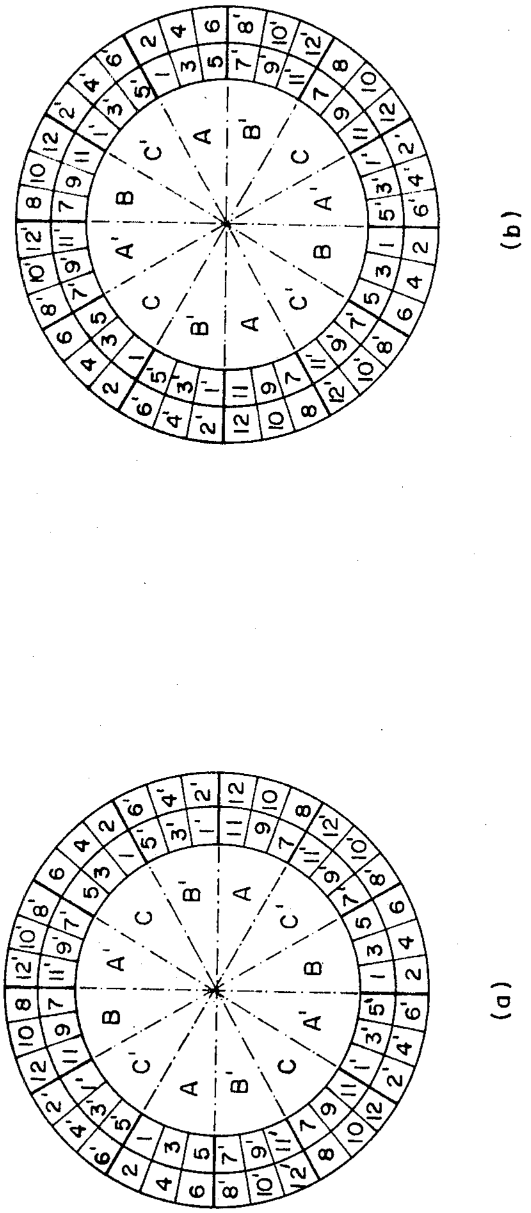
Figure 27:
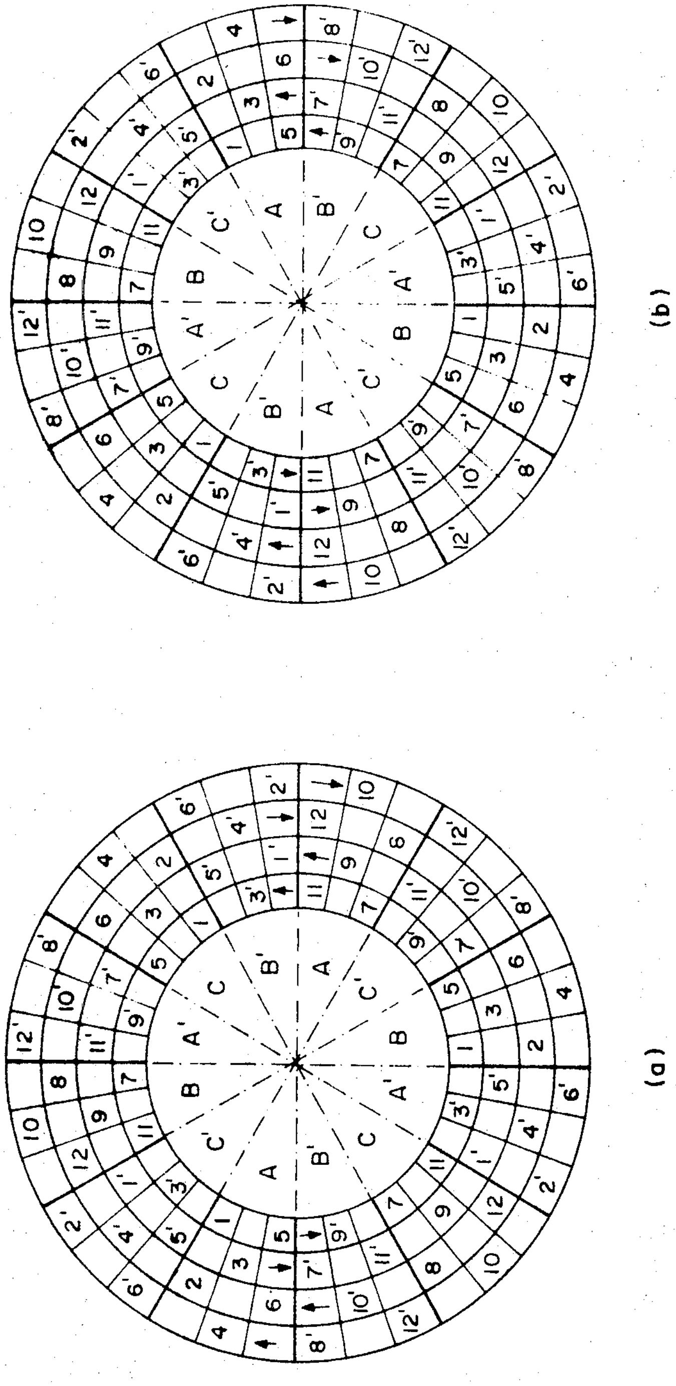

FIGS. 26(*a*) and (*b*) are cross-sectional views of the armature conductors in the active region as viewed from the regular and terminal ends, respectively, of the armature FIGS. 27(*a*) and (*b*) are cross-sectional views of the sub-layers of the armature bars of FIGS. 26(*a*) and (*b*) respectively.

Figure 28:
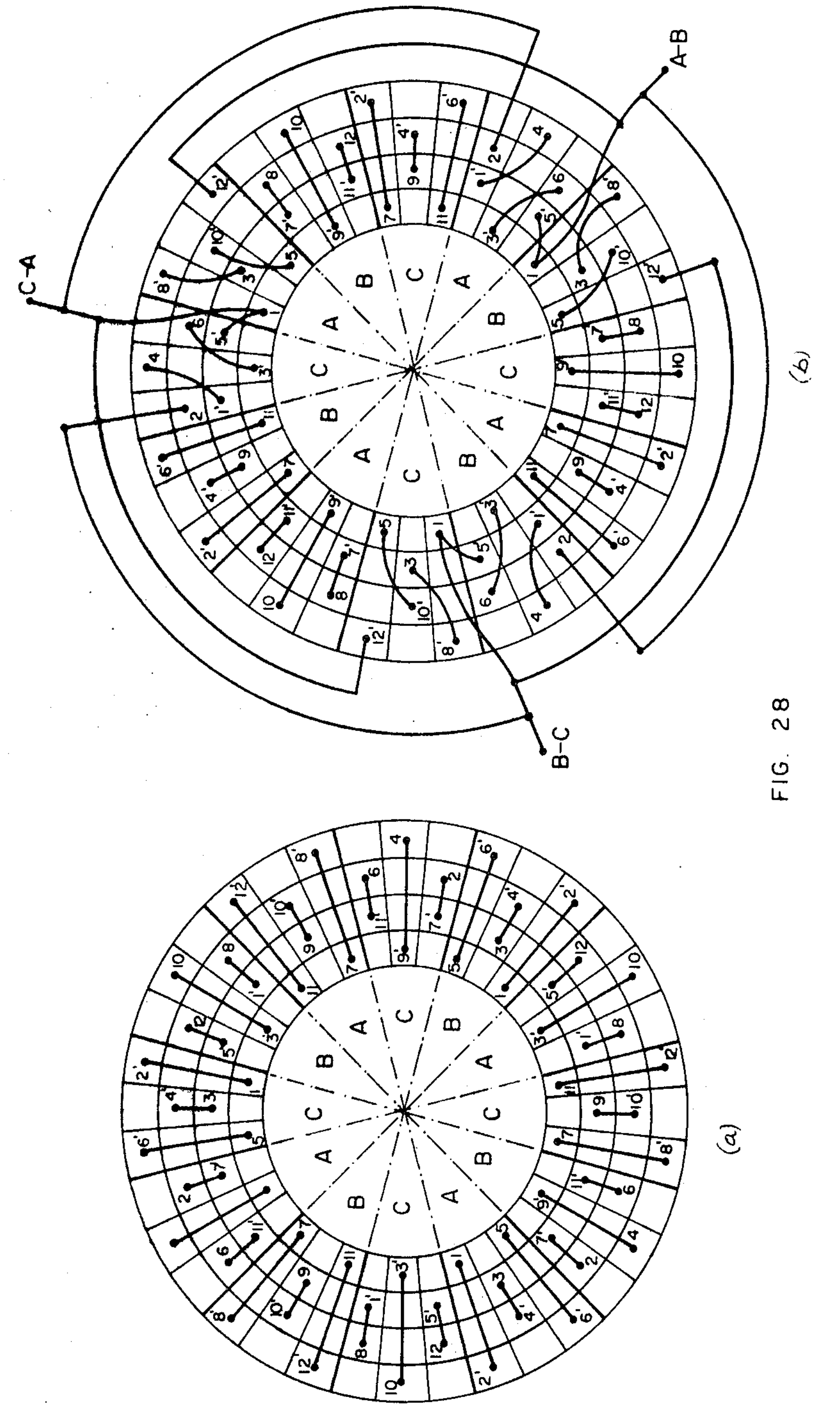

FIGS. 28(*a*) and (*b*) show the connections of the sub-layer bars of FIGS. 27(*a*) and (*b*) at the ends of the armature.

Figure 29:
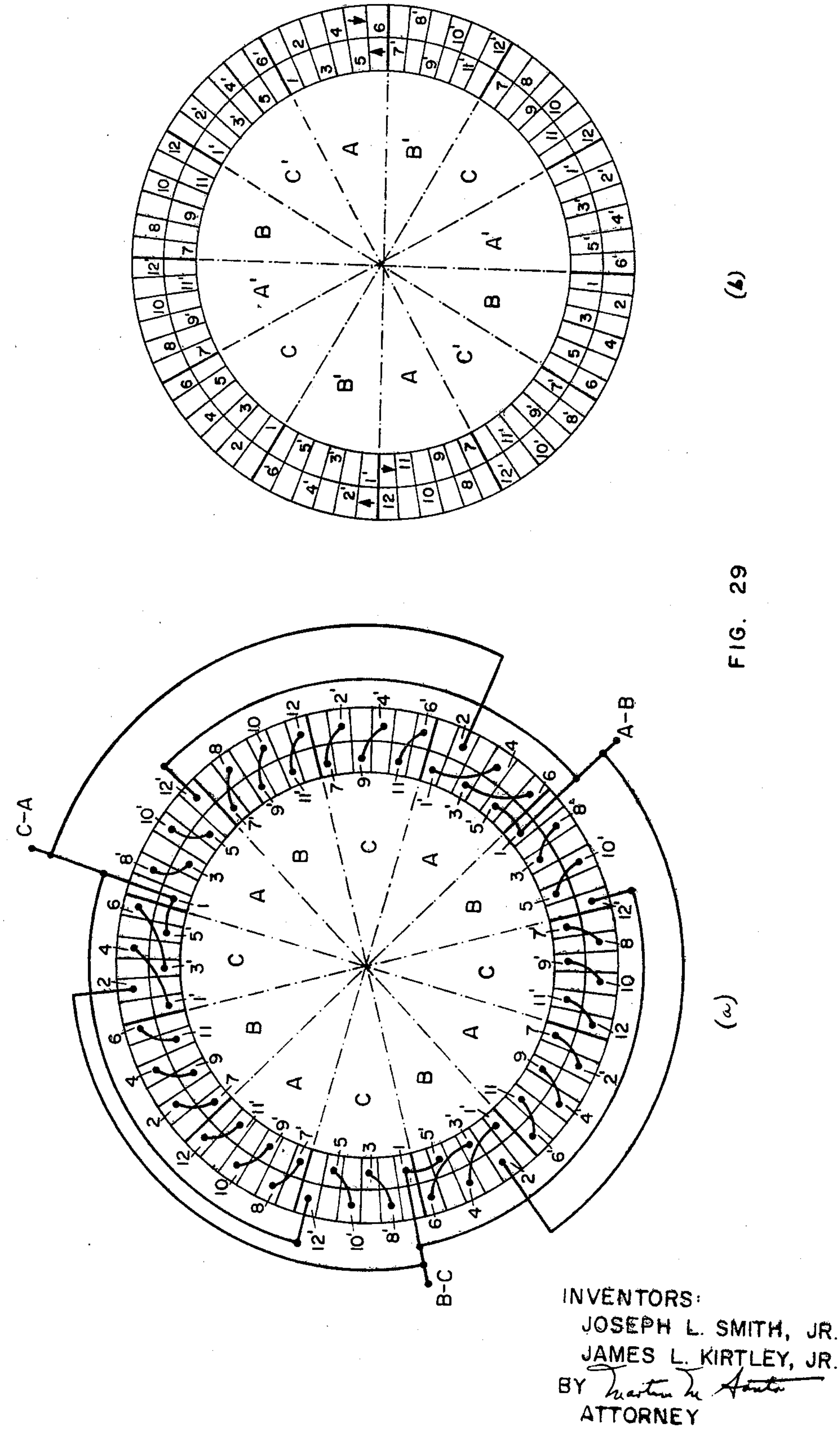

FIGS. 29(*a*) and (*b*) show the terminal end bar connections and the sublayers, respectively, for a single layer, two sublayer armature winding.

Figure 30:
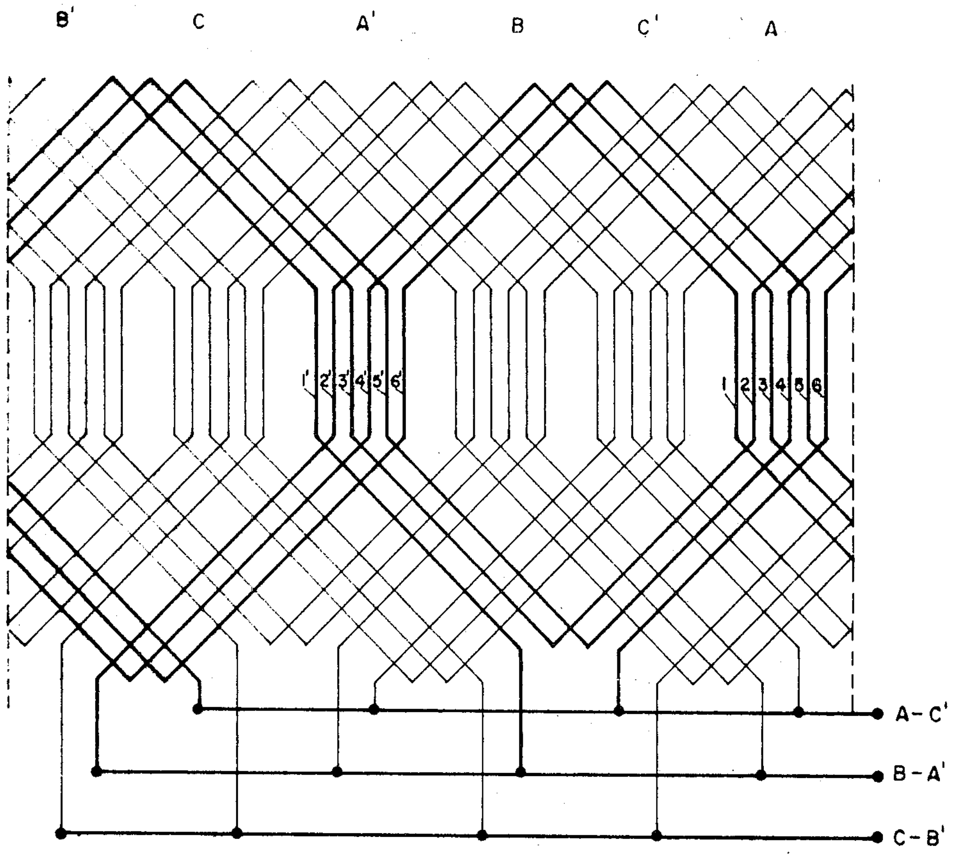

FIG. 30 shows a dual wave winding for a three phase, two pole armature.

FIGS. 31–35 show views of the bars in the active region, the sublayer at the bastard end, the sublayers at the regular end, the bastard end connections, and the regular end connections, respectively, of an alternate armature winding for a four-pole, two-layer, three-phase armature.

Figure 35:
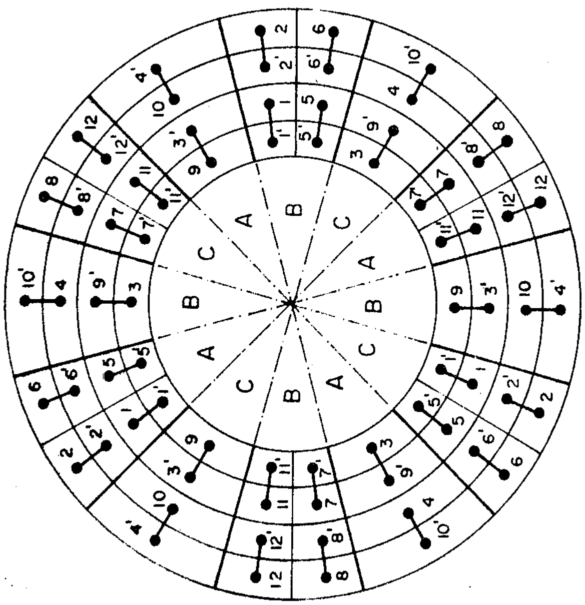
Figure 36:
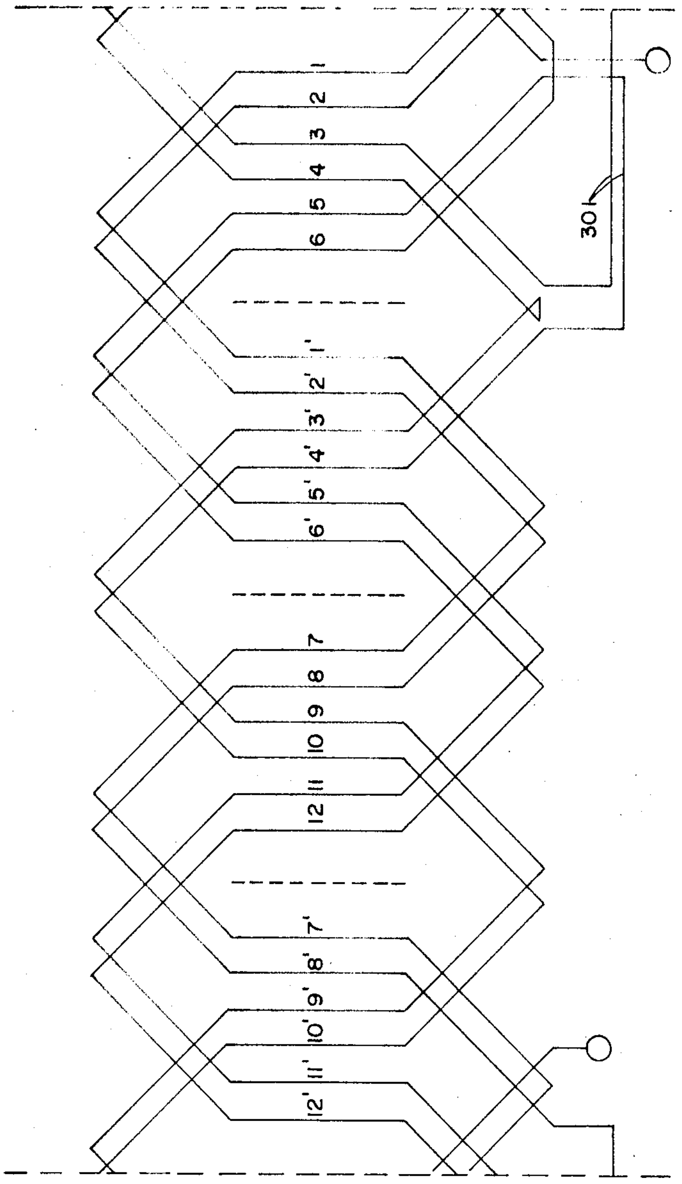

FIG. 36 is a conventional developed representation of one phase winding of the armature winding of FIGS. 31 – 35.

Figure 37:
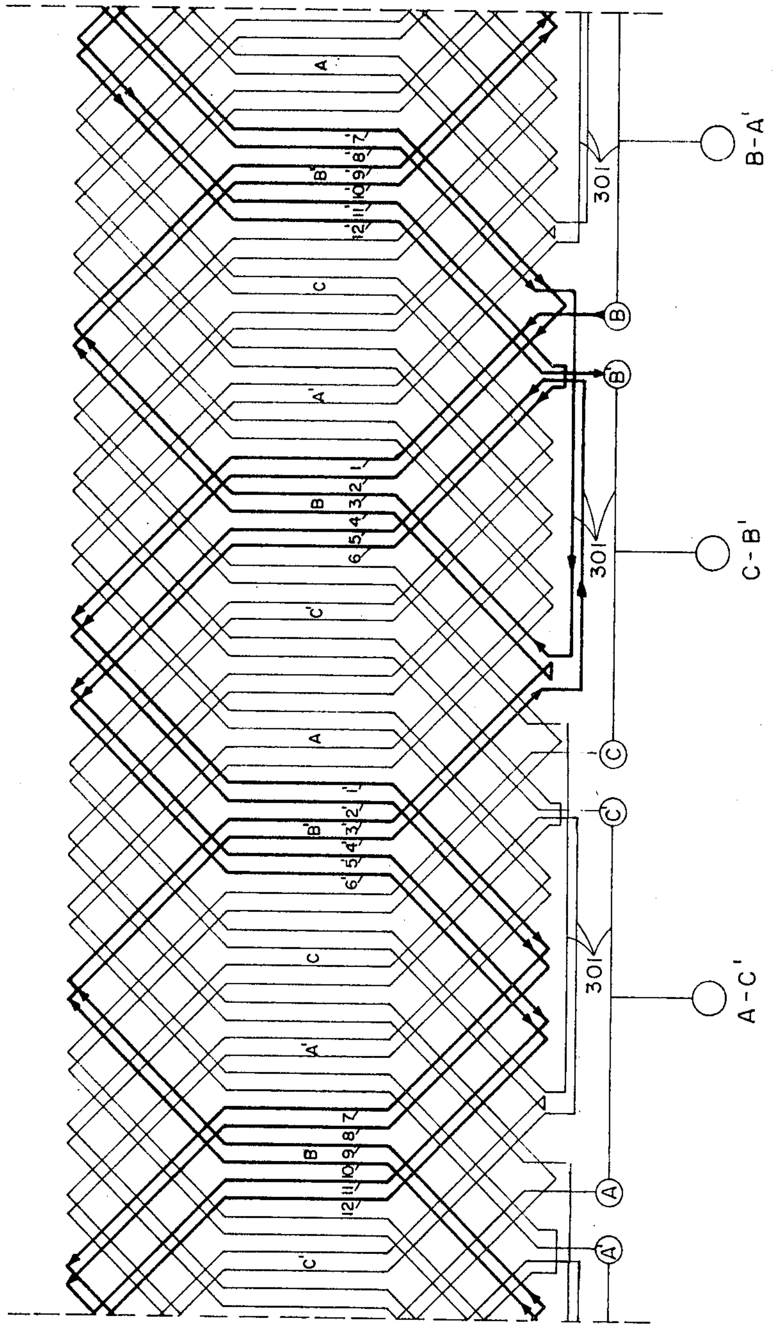

FIG. 37 is a conventional developed representation of the three phases in a delta connection of the armature winding of FIGS. 31–35.

Figure 1:
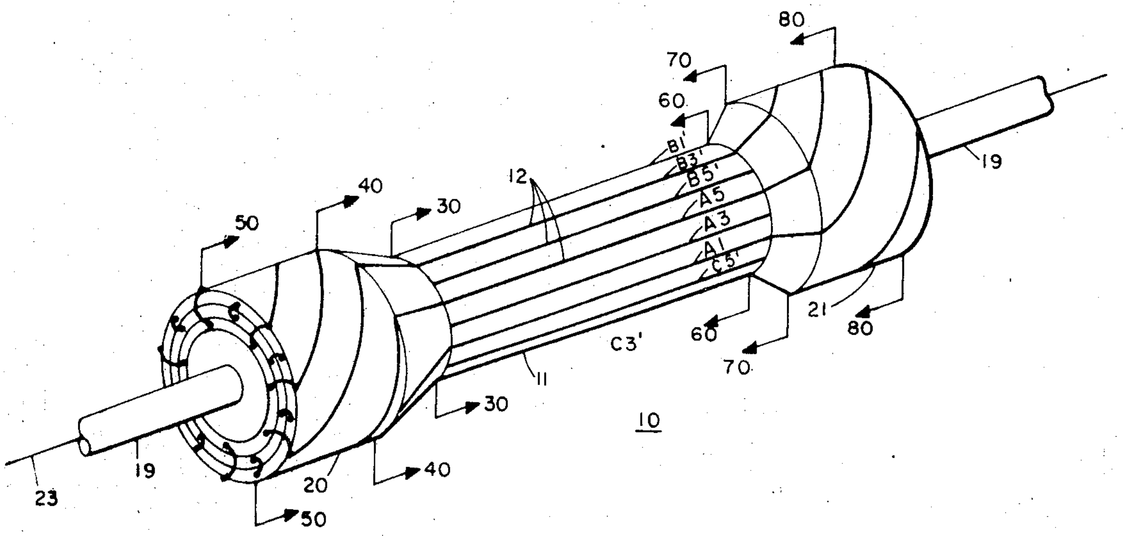
FIG. 1 is a perspective view of one embodiment of the armature of this invention.

A perspective schematic view of the armature 10 of a preferred embodiment of the invention is shown in FIG. 1. This view shows the outermost armature conductors together with an end connection of the armature conductors for a two-pole, two-layer, three-phase armature winding. The armature conductors or bars are fabricated in a manner to reduce eddy current losses by twisting a number of small insulated conductors to form larger wires which are in turn twisted to form a bar of rectangular cross-section; hence the use of the term "bar."

Figure 2:
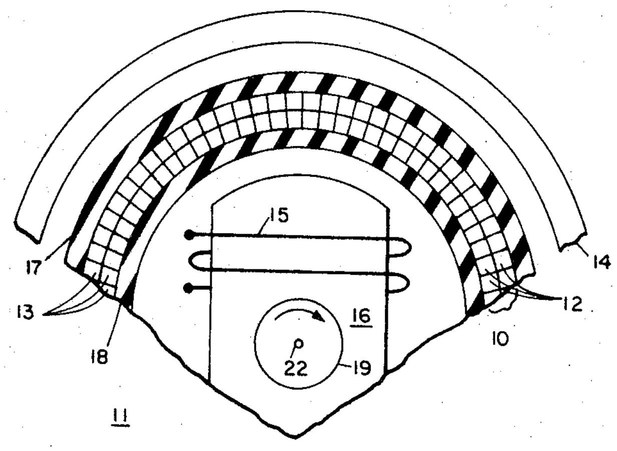
FIG. 2 is a cross-sectional view of the armature of FIG. 1 taken in the active region.

A detailed partial cross-sectional view of a preferred embodimet showing in cross-sectional detail the armature 10 of FIG. 1 is shown in FIG. 2. The armature 10 consists of conductors in the form of bars 12 which are arranged circumferentially about the axis 23 of the generator 11. Each bar is insulated by an insulator 13 surrounding the bar. The insulating rating of insulation 13 is determined by the maximum voltage gradient which exists between adjacent bars 12 consistent with an appropriate factor of safety. Since the armature 10 is wound according to this invention to produce a controlled and relatively low voltage difference between adjacent bars 12, the area of the insulation 13 will be only a small fraction of the area occupied by the electrically conductive armature bars 12. The resulting armature configuration has substantially more space available in the active center region 11 for armature bars than a conventional generator where the armature bars are set in slots in the magnetic structure surrounding the armature. In the conventional configuration, each bar in a slot adjacent to the magnetic structure, which is at ground potential, is insulated to withstand the full phase voltage.

In the preferred embodiment, coil 15 is a superconducting coil which is aryogenically cooled to the superconducting temperature and energized with direct current through slip rings (not shown) on shaft 19. An example of such a coil design is disclosed in the paper "The Application of Superconductors in the Field Windings of Large Synchronous Machines," by H. H. Woodson, J. L. smith, Jr., P. Thullen and J. L. Kirtley, IEEE Transactions of Power Apparatus and Systems, Vol. PAS90, No. 2, June, 1971, a copy of which is in the U. S. Patent Office Scientific Library. Superconducting field windings are preferred because they are capable of producing the large magnetic fields desired without the need for ferromagnetic material magnetic path to provide a low reluctance magnetic path through the armature. In this event, the field may be constrained by surrounding the armature with an aluminum or other electrically conductive shell 14 in which eddy currents are induced by the rotating field. Shell 14 would be placed as far away from the armature 10 as possible, consistent with space limitations, in order to reduce the losses produced by these shielding eddy currents.

Field coil 15 may also be constructed of cryogenically cooled copper 25 or conventionally cooled copper conductors could be used. In this case, the shell 14 should be of a laminated ferromagnetic material in close proximity to the armature 10. The shell 14, of laminated ferromagnetic material, may also be used for the machine when winding 15 is made of superconductors.

The armature 10 has a cylindrical layer of insulation 17 surrounding it and a layer of a solid, liquid (oil), or gas insulation 18 between it and the field structure 16. Since both the shell 14 and the field coil supporting structure 16 are at ground potential in a machine, the insulation layer 17, 18 must be capable of withstanding the maximum potential that exists in the armature winding, namely the terminal voltage of the machine. Thus, although the thickness of the insulating layer 17, 18 may be the same as that about the individual conductors of the conventional armature, much less total volume of insulation is required.

Figure 3:
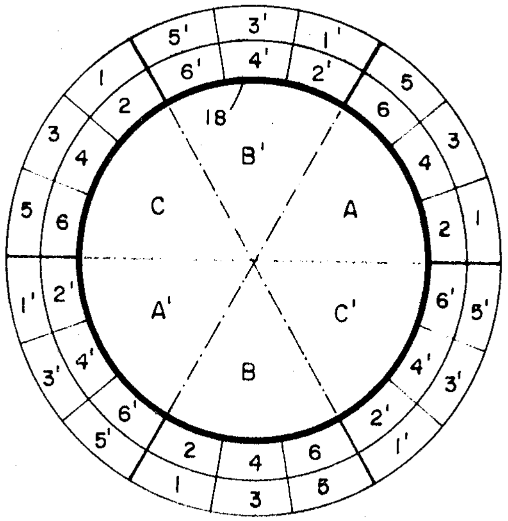
FIGS. 3 and 6 are cross-sectional views of the armature conductor bars taken at the ends of the active region.
Figure 6:
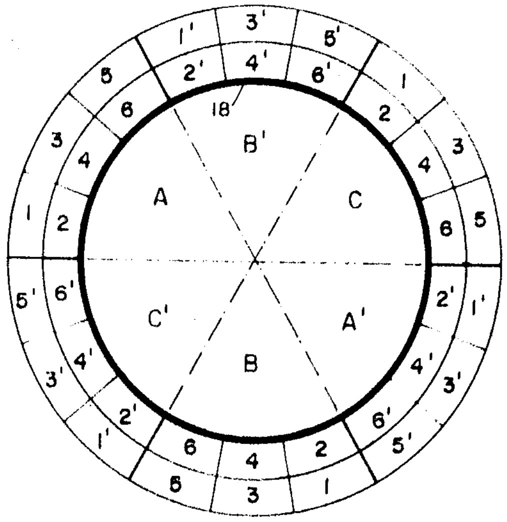

The region between the sectional view designations 30 and 60 in FIG. 1 is the active region of the armature. It is in this region that the armature bars 12 generate power under the influence of the rotating field structure 16 which extends longitudinally along the armature 10 between sections 30 and 60. The armature 10 of FIG. 1 at region 11 is again shown in cross-section in FIGS. 3 and 6 to assist in the understanding of the invention by a detailed consideration of the armature winding. In FIG. 3, FIG. 6 is a mirror image as viewed from the other end, the phase belts or halves A, A', B, B', C and C' are shown with a six bars per phase belt. Six bars are adequate to illustrate the invention although in an actual machine, the number would probably be many times larger in order to get the high output voltages generally desired. The bars in each phase belt are numbered in the same sequence with the primed numbers indicating those bars in the primed phase belt.

Figure 4:
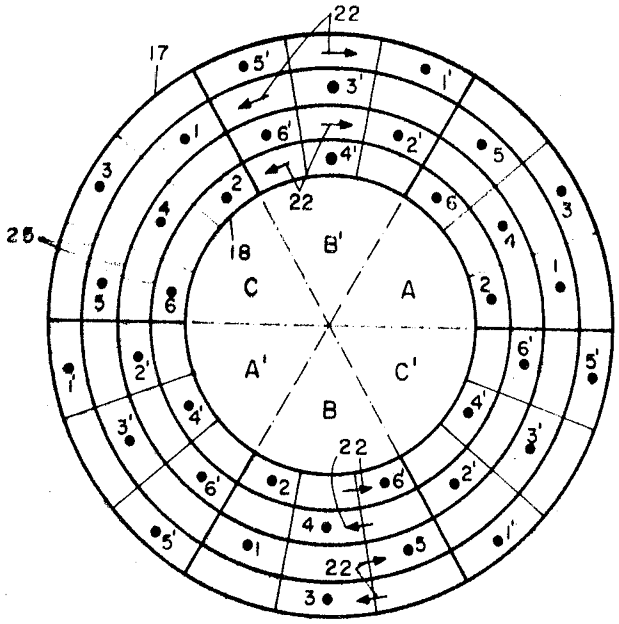
FIGS. 4 and 7 are cross-sectional views of the bars of FIGS. 3 and 6 respectively after they have been formed into sublayers.

As shown in FIG. 1 the outer diameter of armature 10 increases in the region between sections 30 and 40 while retaining the inside diameter of the active region 11. Armature views at sections 40, 70, FIGS. 4, 7 respectively, show that the two layers of bars of FIGS. 3, 6 have been formed into four layers of bars which will be designated "sublayers." It is seen that alternate conductors of a layer are arranged to form one of the two sublayers. Comparison of FIGS. 4 and 7 discloses that corresponding sublayers at the two ends of the armature are formed of the same bars. Thus, all conductors forming any sublayer are offset radially outward by the same amount at each end. The innermost sublayer has the same diameter as the inner layer and is not offset. Formation of the four sublayers from the two layers provides one bar space between bars in each sublayer thereby providing the space required to permit each bar in a sublayer to be bend into the spiral form of the bars of the sublayer in the armature end regions 20, 21. Each bar of a sublayer spirals through substantially 90 electrical degrees; for a two-pole machine this is 90 mechanical degrees. The direction that each sublayer is spiraled is shown by the direction arrows 22 of FIGS. 4 and 7. At one end, shown in FIG. 4, the sublayers alternate in thier winding direction which results in alternate conductors of each layer being spiraled in opposite directions. For an odd number of bars per layer per phase belt as in FIG. 4, three in this case, this results in spatially corresponding bars, such as bars 1 and 1' of the two phase belts A, A', lying in radial alignment as shown in FIG. 4 to be electrically connected together to form an armature turn.

Figure 8:
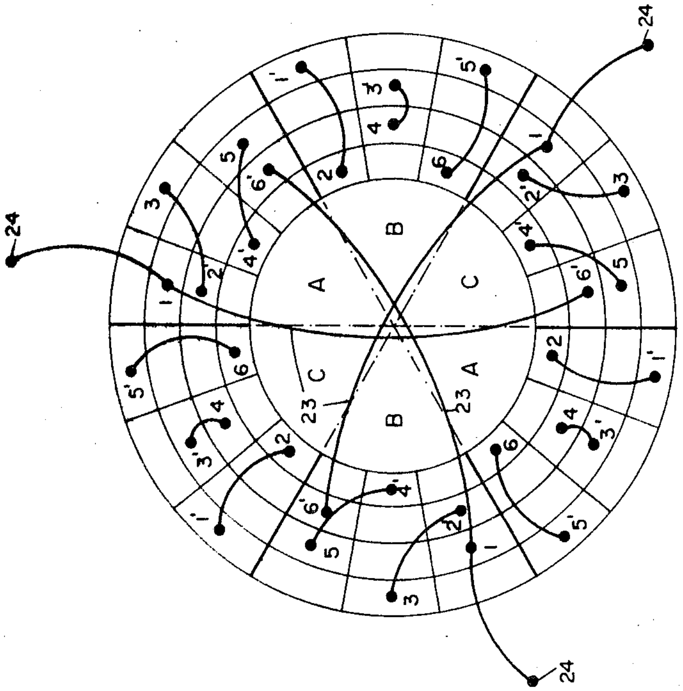
Figure 7:
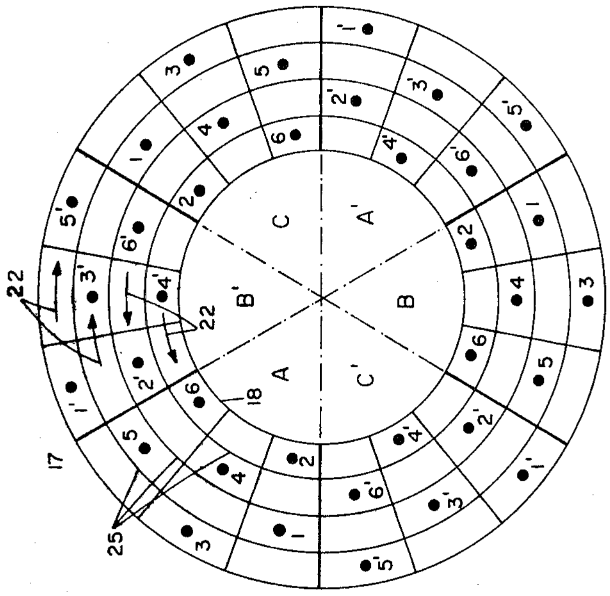

At the other end of the armature, shown in FIG. 7, the two outermost sublayers are rotated in one direction, while the two innermost sublayers are rotated in the opposite direction. FIG. 8 shows the bar connections made at this same armature end to produce the ordered progression of serially connected turns within a phase since the primed numbered bars from one phase belt are connected to the next higher unprimed numbered bars of the other phase belt.

Figure 5:
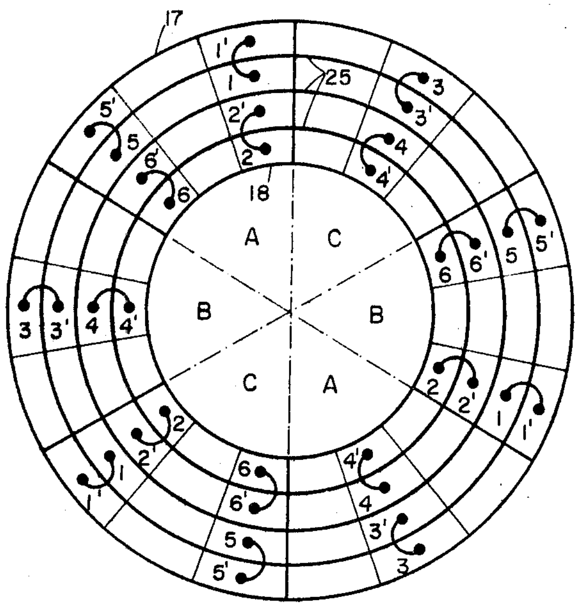
FIGS. 5 and 8 are views of the sublayer bars showing their connections to each other at each end of the armature.

FIGS. 5 and 8 then show the ordered sequence in which the bars are serially connected at each end of the armature to form a phase winding beginning at bar 1 and ending at bar 6' for each of three phases A, B and C. As shown in FIG. 8, three electrical coils, phases A, B and C windings, with electrical axes 120° apart, may have bars 1 and 6' of different phase belts connected together by connectors 23 to form a balanced three-phase delta connection with output terminals 24. Bars 1 and 6' of different phase belts are seen in FIG. 3 to be adjacent to one another in the active region of the armature.

The sequence of connection of the bars in any one phase is 1—1'-2—2'-3—3'-4—4'-5—5'-6—6'. Within one phase half of the conductor sequence is 1-2-3-4-5-6. Thus, the voltage difference between adjacent bars in a row, such as bars 1 and 3 FIG. 3,6 is twice the voltage per turn (four times the voltage developed in each bar), with the maximum potential existing between the diagonally adjacent bars, such as bars 1 and 4, where the voltage difference is three times the voltage per turn. The insulation around the bars is determined by these potentials whereas the much greater phase to ground potential is insulated by cylindrical insulation 17, 18.

In the region 20, 21 where the bars of the sublayers are being spiraled, bars of different phases will be crossing one another and potential differences of phase voltage magnitude will exist between adjacent sublayers. It is therefore necessary to provide electrical insulation between the sublayers in addition to that already around the individual bars. This insulation is provided in the form of cylinders of insulation 25 between sublayers as shown in FIGS. 4, 5, 7 and 8. These cylinders of insulation extend axially over the region 20, 21. Insulation layers between sublayers which spiral in the same direction may be omitted since adjacent bars remain adjacent.

Figure 8A:
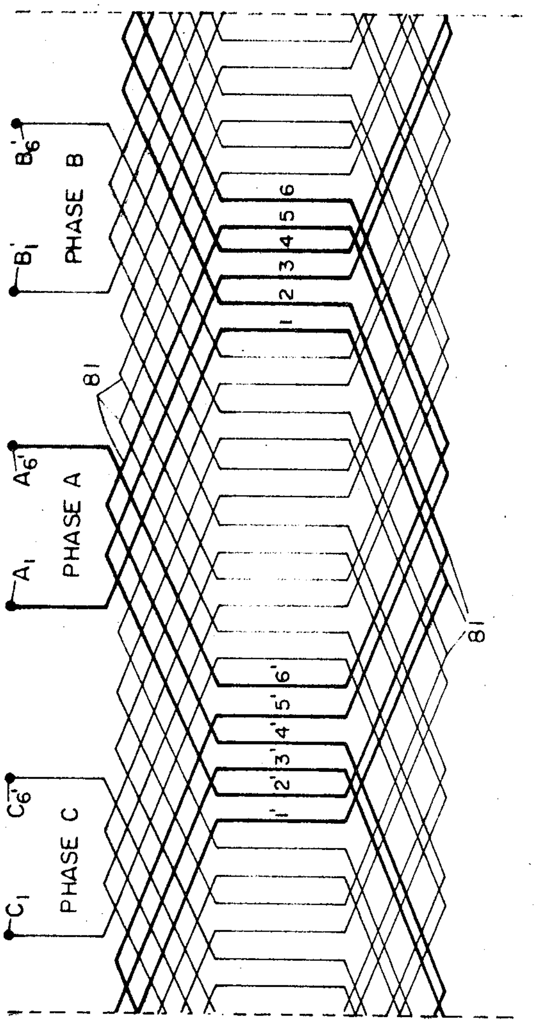
FIG. 8A is a conventional representation of a three phase, two pole, two layer armature winding.

A more conventional representation of the winding of the three phases A, B, and C of the two layer, two pole machine is shown in FIG. 8A. The six bars 1–6 and 1'–6' in each phase belt are shown. Reference to FIGS. 4 and 7 shows the relation between the left hand and right hand helix of the bars at each end of the armature in FIG. 1, and the direction of the end turns of FIG. 8A. It is seen that the winding is a combination of lap and a wave winding which results in half of the bars being "C" shaped and half "S" shaped between the connectors 81 by which the bars are connected to one another.

Figure 9:
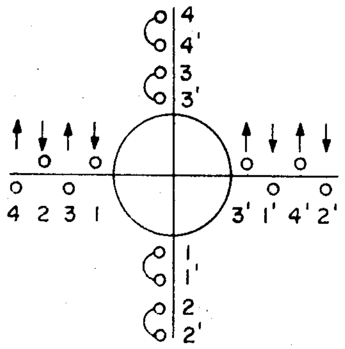
FIGS. 9 and 10 are alternate representations of the bar arrangements of FIGS. 4, 5, 7 and 8 respectively.
Figure 10:
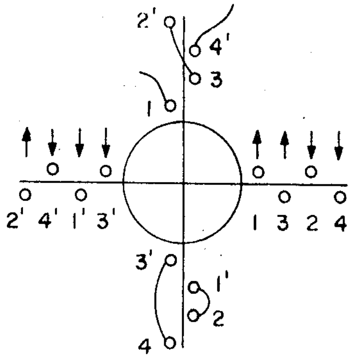

An alternative representation of the basic unit of the armature bar configurations of FIGS. 4, 5, 7 and 8 is shown in FIGS. 9 and 10. FIG. 9 shows the bars at section 40 and at section 50 but is limited to only enough bars to illustrate how a basic unit of the winding is connected in this case four bars per phase belt. Once the interconnection of four bars is established, the remainder of the bars are connected in the same manner to each other and to adjacent groups of bars. However, the interconnection across the phase joints must be considered separately. In FIG. 9 the bars 1–4 and 1'–4' of a unit are shown with arrows which indicate the direction of the helix in end region 20. The initial position of the bars, as at section 40 of FIG. 1, is depicted by the bars along the abscissa of FIG. 9. The positions of these same bars at section 50 is shown along the ordinate of FIG. 9, the end connections of corresponding conductors 1 and 1' etc. are shown.

The other end of the armature is shown in FIG. 10. The bars along the abscissa represent the position of the bars at section 70; the bars at section 80 are represented as lying along the ordinate of FIG. 10. The bars are connected as shown to provide the serial connections of the turns provided by the bar connections shown in FIG. 9. As seen in FIG. 10, electrical connection within a phase belt to a group of four bars is made to bars 1 and 4'. Thus bar 4' of one group of four is connected to bar 1 of the next group of four. In order to obtain the most desirable symmetry across the phase boundaries, a phase belt should be composed of a number of four bar groups plus a half group of two bars, as in the preferred embodiment. However, a phase belt could be composed of any number of bars and still maintain the major desirable characteristics.

The bar arrangement of FIGS. 9 and 10 has bar 1 of one phase belt and its corresponding bar 1' of the other phase belt located in different sublayers. In this case the connection of the bars is in the following order 1—1' - 2—2' - 3—3' - 4—4'. Therefore, for both phase belts the bars are sequentially connected from the inner bar 1 to the outer bar 2 before moving over to the laterally adjacent inner bar 3 and then to bar 4. As stated previously, this wiring arrangement causes the potential gradient to be greatest on a diagonal between the inner and outer bars of adjacent radial columns of bars where the potential difference is three times the voltage generated in one turn of a phase winding, i.e., three turns of voltage; but circumferentially adjacent bars in the same row have only two turns of voltage difference and radially adjacent bars have only one turn of voltage difference.

A number of alternate methods of interconnecting the bars of the winding will retain some of the advantages of the invention but not all of the advantages. A few of the many alternates will be described.

Figure 11:
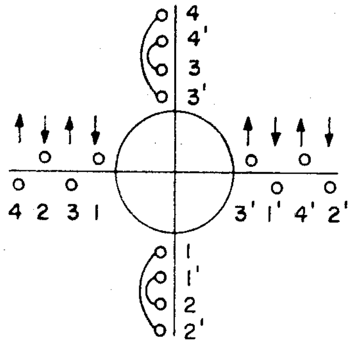
FIGS. 11 and 12 show alternate end connections of the armature bars to that of FIGS. 9 and 10.
Figure 12:
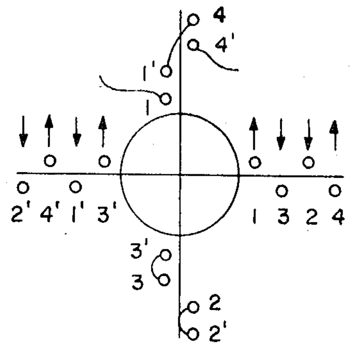

With the same bar configuration at and between sections 40 and 70, another possible interconnection of bars is shown in FIGS. 11 and 12. FIG. 11 shows a method of connection of the bar at end 50 different from that shown in FIG. 9. The corresponding helices and connections at section 80 are shown in FIG. 12. The electrical order of the interconnection of the bars of FIGS. 11 and 12 is then 1–2′ - 2–1′ - 4–3′ - 3–4′. The sequence of connections is 1, 2, 4 and 3 in one phase belt and 2′, 1′, 3′, 4′ in the other phase belt. The maximum potential difference is still three times the voltage per turn but now exists between adjacent bars in the same row, bars 1 and 3 of one phase belt and bars 2′ and 4′ of the other phase belt, and lesser potential differences between the other adjacent bars.

A consideration of the relative merits of the winding arrangement of FIGS. 9, 10 with respect to that of FIG. 11, 12 leads one to prefer that of FIGS. 9, 10 even though the maximum voltage difference in each case is the same. The reason for this preference is that in the winding of FIGS. 9, 10 the maximum potential gradient exists between conductor 1 and 4 which are in different layers and therefore can be insulated from one another by a cylindrical layer of insulation (not shown in FIG. 2) between layers in the active region and in the helix end region 20, 21. This reduces the insulation which must surround each bar since the voltage between the bars in the same layer is only two times the voltage per turn. In contrast, the winding of FIGS. 11, 12 produces the maximum gradient between bars in the same layer which requires more insulation between the bars of each layer. The advantage in having a cylindrical layer of insulation instead of insulation between bars in the same layer is apparent.

Figure 13:
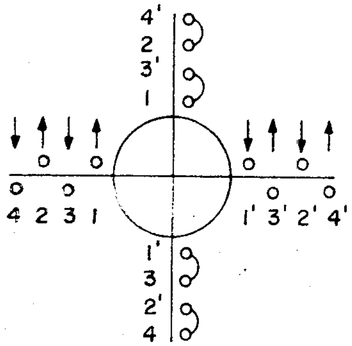
FIGS. 13 and 14 show other alternate end connections of the armature bars to that shown in FIGS. 9 and 10.
Figure 14:
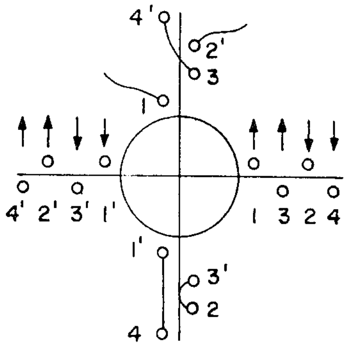

A second possible alternate configuration of the bars in which the geometrically corresponding bars such as 1 and 1′ are in the same sublayer is shown in FIGS. 13, 14. Since all bars in a sublayer helix in the same direction, bars 1 and 1′ of FIG. 13 cannot be connected to each other as in the preferred embodiment, but must be connected to other bars. The corresponding end connections at the other end of the machine are shown in FIG. 14. The resulting sequence of connection of the bars is seen to be 1–3′–2–4′–3–1′–4–2′. Therefore, for one phase belt the order of connection of the bars is 1, 2, 3, 4 and the potential distribution between bars is the same as that existing in FIGS. 9 and 10, since the order of connection of bars is the same. However, the order of connection for the other phase half is 3′, 4′, 1′, and 2′ which results in a potential gradient between adjacent bars of adjacent groups of four bars of 6 times the voltage per turn.

Figure 15:
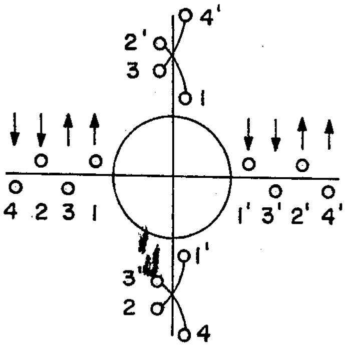
FIGS. 15 and 16 show still another alternate end connection of the armature bars other than that of FIGS. 9 and 10.
Figure 16:
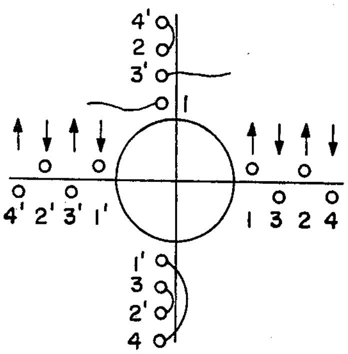

A third alternate winding arrangement for the situation where bars 1 and 1′ are in the same sublayer is shown in FIGS. 15 and 16. The order of connection of the bars is seen to be 1–2′–3–4′–2–1′–4–3′. In each phase half the order of connection of the bars is 1, 3, 2, 4 and 2′, 4′, 1′, 3′ for which the maximum potential gradient is 4 times the voltage per turn and occurs between alternate adjacent bars of a layer.

It is apparent that there are several winding configurations which may be employed for a two-layer armature winding, with substantial differences in the maximum potential gradient between armature bars. The minimum potential gradient is obtained with the configuration illustrated in FIGS. 3–10 and is the preferred embodiment. Many other combinations of connecting the bars to form turns of the armature are possible but those presented here are illustrative of the invention.

The two layer armature has been described in accordance with this invention with four sublayers, two being wound in one direction and two in the other to be connected to each other at the armature ends. A single layer armature can be wired in the same fashion by causing each of four adjacent bars in the one layer to be in one of four sublayers in the end regions 20. 21. Optimally, the adjacent bars 1, 2, 3, and 4 of the single layer are arranged in four sublayers as in FIGS. 9, 10 in which case the maximum voltage difference between adjacent bars in the active region is one turn voltage; however, the maximum voltage difference between adjacent bars in a sublayer is that of four turns.

Figure 17:
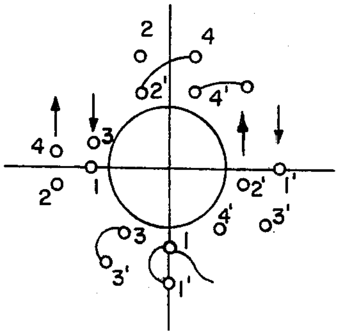
FIGS. 17 and 18 show the sublayer bar end connections for an armature having only a single layer in its active region.
Figure 18:
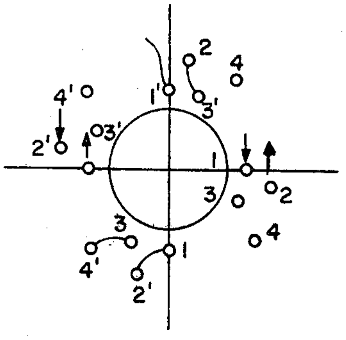

It is also possible to connect the bars of a single layer armature in a uniform voltage gradient winding in accordance with this invention by using only two sublayers. If the two sublayers at one end of the machine are twisted as shown in FIG. 17 and the connections between bar ends 1 and 1′, etc. are made as shown, it is seen that the bars in one phase belt have their ends in a different sublayer at one end, FIG. 17, than at the other end, FIG. 18, of the machine.

Figure 21:
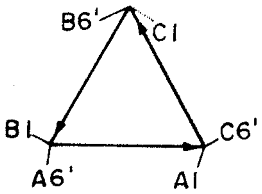
FIGS. 21 and 22 show the phase connection diagrams for a delta and wye connection, respectively, of the armature phases.
Figure 22:
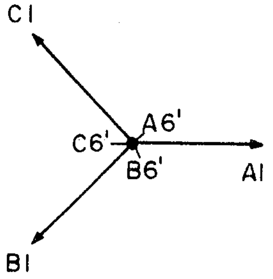
Figure 23:
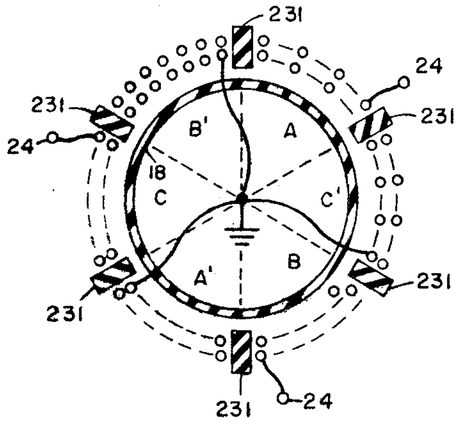
FIG. 23 is a cross-sectional view of the armature showing insulating segments between the phase belts required when the wye connection of phases is used.

Although the preferred embodiment of the two pole, two layer machine has been described with the phases connected in a delta connection, it is possible instead to connect the phases in a wye connection with the center of the wye either connected to ground potential or floating as preferred. Reference to FIG. 8 shows that the delta connection has bars B1 and A6′, A1 and C6′ and C1 and B6′ connected to each other to form the three terminals 24 of the three phase delta connection. This delta connection is shown in the form of an electrical vector diagram in FIG. 21. The electrical vector diagram for the wye connection with a ground connection is shown in FIG. 22. To provide this connection, armature bars A6′, B6′, and C6′ of FIG. 8 are connected together and grounded with the output terminals 24 being at bars A1, B1 and C1. Inspection of FIG. 6 discloses that bar A6′, which is at ground potential, and bar B1 are in adjacent columns of bars on the armature. Thus, the full phase voltage difference exists between these bars, and an insulting separator running the length of the armature capable of withstanding the phase voltage must be placed between the columns containing these bars. Since a phase voltage difference likewise exists between C1 and B6′ and A1 and C6′ at the boundaries of the other phase halves C and B′ and halves A and C′, insulating separators between these phase belts are also required. Also since C6 differs by only a half-turn voltage from C6′ and A1′ differs by only a half-turn voltage from A1, it follows that insulating separators are also required at the remaining phase boundaries, namely between phase halves C and A′, B and C′, and A and B′. The insulating separators must moreover extend throughout the length of the end regions 20, 21 to insulate adjacent bars at the phase belt boundaries. A cross-sectional view as at section 30 of FIG. 1 is shown in FIG. 23 where the insulating separators 231 are shown between the phase belts.

Another embodiment of an armature winding incorporating this invention is to wind each phase of the armature as if there were only a single layer and serially connect the upper to the lower layer phase winding to form the complete phase winding. The single layer winding has been previously discussed and may be constructed using two or four sublayers. The two layer machine of this embodiment would have twice this number of sublayers.

Figure 24:
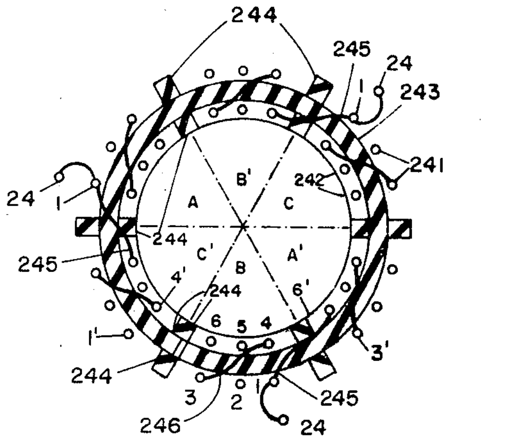
FIG. 24 shows the inter-layer insulation required between layers of bars in a two layer armature for an armature winding having serially connected layes in each phase belt.

This embodiment for a two pole machine is shown in FIG. 24 as a cross-sectional view of an armature in its central active region as at section 30 of FIG. 1 with two layers of conductors 241, 242 and a cylinder of insulation 243 separating the layers. The insulator 243 is required to withstand the voltage developed between serially connected layers of a phase winding. As an example, consider phase B where bar 1 of the top layer of that phase provides one output terminal 24. The last bar 3 of the upper layer of one phase half B is connected to the first bar 4 of the lower layer of the same phase half by connection 246. It is apparent that a voltage difference exists between radially adjacent bars, such as bars 1 and 4 of a phase half, which difference in voltage is one-half of the phase voltage. Therefore, these bars must have an insulator 243 between them capable of withstanding that voltage since the bars should be insulated to withstand only on the order of a turn voltage. In addition, insulation 244 is required at the phase winding boundaries even though the phases may be delta connected by electrical connections 245. This requirement exists even though bar 6′ of phase half A′ is connected to bar 1 of phase half B which is diagonally adjacent in the armature and hence at nearly the same potential because the half-phase potential exists between adjacent bars B4 and A6′ and between bars B1 and A3′. This same potential difference exists between all phase winding boundaries, which must be insulated therefore by insulator 244.

An armature of more than two layers with the layers insulated from each other and connected in series to produce a radial voltage graident can be constructed by an extension of the method illustrated in FIG. 24.

Figure 19:
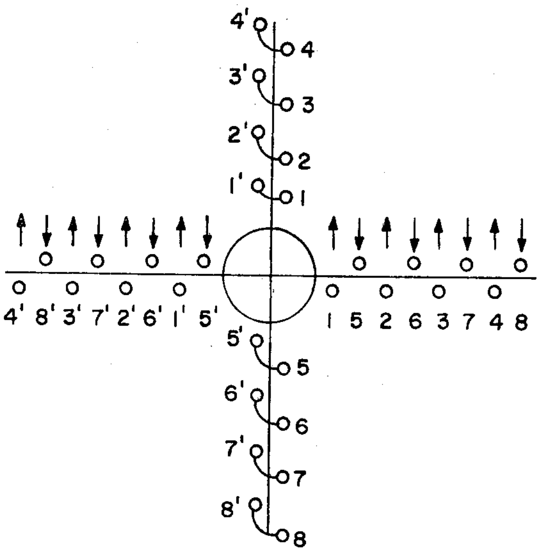
FIGS. 19 and 20 show the sublayer bar end connections for an armature having four layers in its active region.
Figure 20:
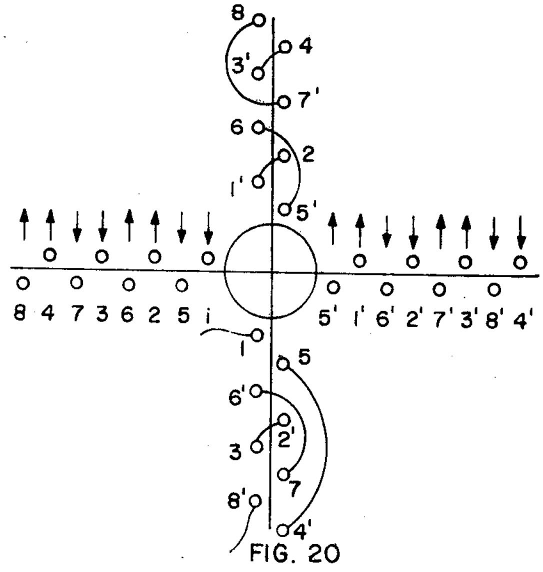

The preceding paragraphs have described how a single-layer and a two-layer armature can be conveniently constructed according to the invention if four sublayers are provided at each end. Where the number of layers of bars in the armature exceeds two, this method can still be used. For example, for a machine with four layers, the wiring configuration of the bars is illustrated in FIGS. 19, 20 for the two ends, where eight sublayers are shown. The armature bars are considered to be arranged to lie vertically on one another in the order 1, 2, 3, and 4, bar 4 being the top bar of the vertical group. The adjacent group of bars is arranged in order 5, 6, 7 and 8 with bar 8 being the top bar. With an odd number of bars per layer per phase half and for a three-phase machine, the bars for two adjacent columns before twisting are shown along the abscissa of FIGS. 19, 20. The connections at each end after twisting are shown in these figures. The resulting connection of the bars is 1—1′-2-2′- . . . 8—8′ , where bar 1 and bar 8′ correspond to bars 1 and 4′ of the two-layer armature of FIG. 8 for interconnection to other groups of bars. The potential gradient between adjacent bars in the same layer is four times the voltage per turn.

Thus far only embodiments of the invention having two poles have been described. The invention is not so limited and may be incorporated in machines having any number of pole pairs. The description of four-pole machines which follows will illustrate multiple pole pair armature windings.

A continuous gradient winding for a four-pole machine is shown in FIGS. 25–28. This winding is a double wave-winding each wave-winding connected to the other in parallel. Only six bars per phase belt are shown in the interest of simplicity of illustration.

Figure 25:
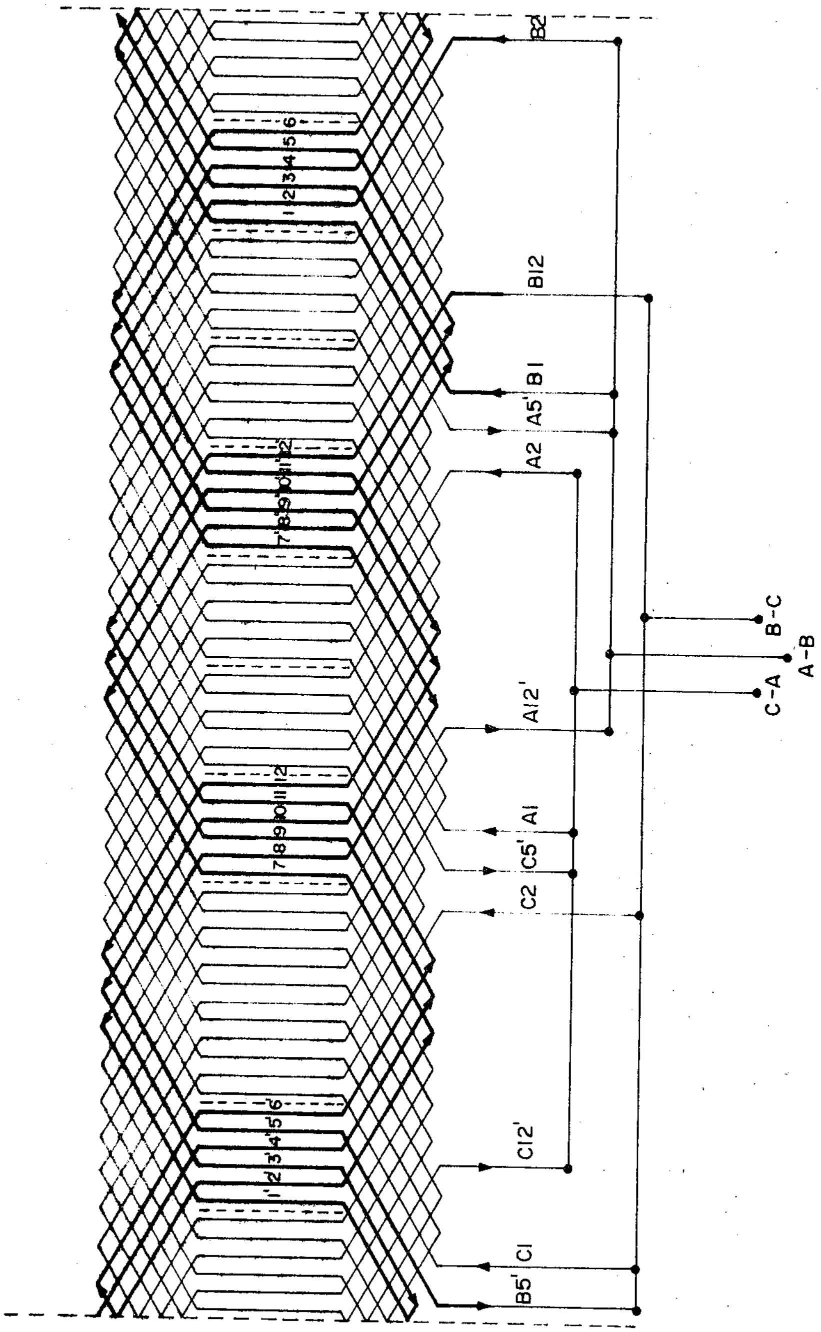
FIG. 25 shows the armature winding in conventional representation of a four pole, three phase armature.

FIG. 25 shows the developed winding in which the even numbered bars of the upper layer have been shifted to the right of the corresponding odd numbered lower layer bars for clarity of the figure. FIG. 26 shows the active (two-layer) section of the winding when viewed from the terminal end and when viewed from the regular end of the machine. The bars are numbered in order of geometric position. FIG. 27 shows the two layers subdivided into four sublayers at each end of the machine. The direction of the helical end turns is also shown for each sublayer at each end. FIG. 28 shows the location of the ends of each bar after being helically turned and the bar connections for both ends of the machine.

As is shown by FIGS. 25–28, each phase winding consists of two windings in parallel. The electrical sequence of the serially connected bars in each phase is 1–2′–7–8′–3–4′–9–10′–5–6′–11–12′ in parallel with serially connected bars 2–7′–8–1′–4–9′–10–3′–6–11–′–12–5′. Each connection is between an inner and an outer layer bar. The 1 - - - 12′ winding starts with an inner bar, while the 2 - - - 5′ winding starts with an outer bar. Winding 1 to 12′ waves around the machine from left to right in FIG. 25 and windings 2–5′ waves around the machine from right to left. With this connection the maximum voltage between any two adjacent bars in a layer is two turns of voltage. The maximum voltage between any adjacent inner layer bar and outer layer bar is one turn of voltage. The maximum voltage between an inner layer bar and an upper layer bar in the next circumferential location is three turns of voltage.

Both sublayers of the outer layer bars helix in the same direction and both sublayers of the inner layer of bars helix in the same direction. Thus only one layer of insulation for full phase voltage is required between the sublayers with opposed helices at each end of the armature. The insulation between bars at all other locations need be only for two or three turns of voltage.

The three-phase winding method illustrated in FIGS. 25–28 can be extended to three-phase machines with more than two-pole pairs. The number of turns of voltage between adjacent bars increases with the number of pole pairs; however, for a given phase voltage the voltage per turn will decrease potentially with the increase in the number of pole pairs.

The winding shown in FIG. 25 may also be considered a development of a single-layer, two-sublayer continuous-gradient winding for a four-pole three-phase machine. In the views corresponding to FIG. 26 all bars would appear in a single layer, numbered in geometric sequence. At the ends of the machine the odd numbered bars would form an inner sublayer and the even numbered bars would form the outer sublayer. At each end the sublayers would helix in opposite directions. The terminal end sublayers, bar ends and bar connections are shown in FIG. 29. The regular end sublayer, bar ends and end connections follow in the same manner from FIG. 25.

Another two-pole armature realization, similar to the four-pole realization of FIG. 25, is the dual wave winding shown in FIG. 30. As in the four-pole case, this realization consists of two sets of coils connected in parallel. In one of these sets the electrical order of the bars is 1′–2–3′–4–5′–6; in the other it is 2′–1–4′–3–6′–5. In the same manner as for the four-pole machine, this may be a single or multi-layer winding in the active or central region of the armature.

Maximum voltage difference between adjacent bars in a layer in the central section is one turn voltage; in the end turns it is two turns voltage.

A related embodiment would have the bars wound in the order 1′–2–3′–4–5′–6 as above, and 1–2′–3–4-′–5–6′. The end connections for these two parallel windings are at the opposite ends of the machine so that corresponding terminals must be connected by conductors which span the length of the armature.

Figure 31:
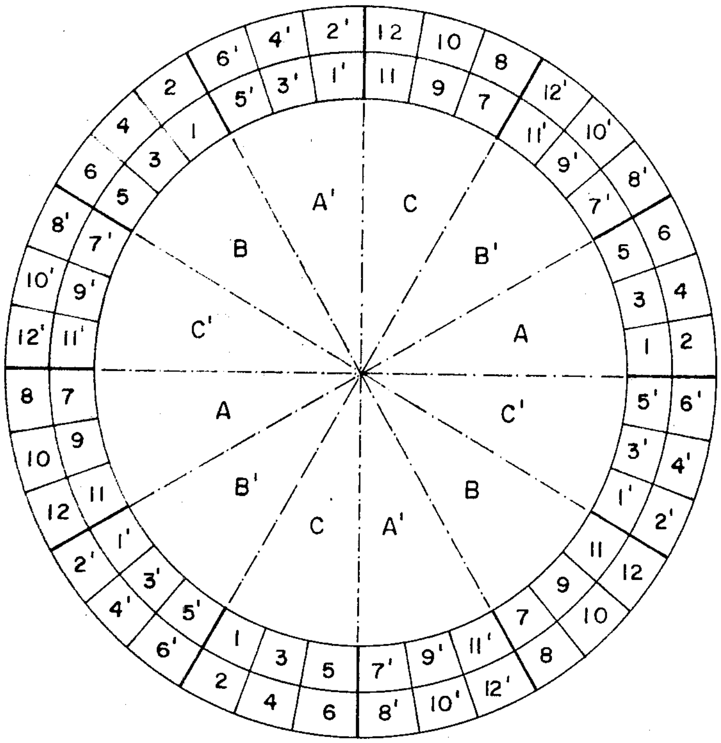
Figure 33:
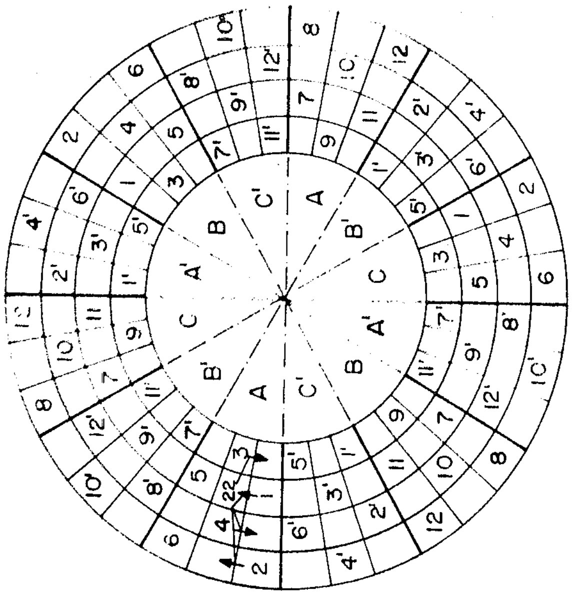
Figure 32:
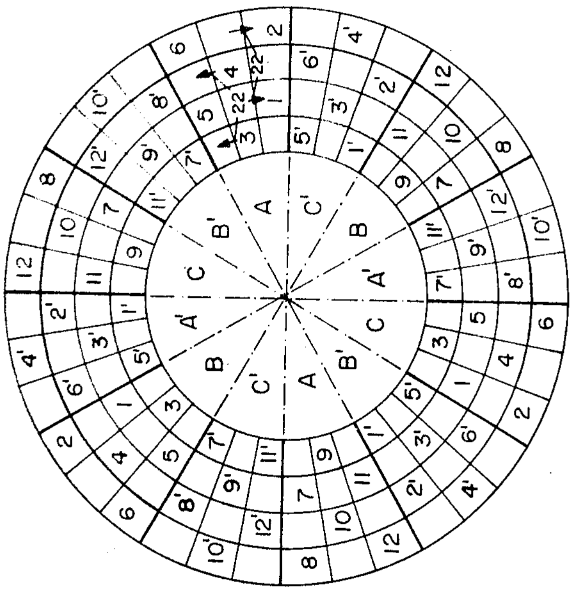
Figure 34:
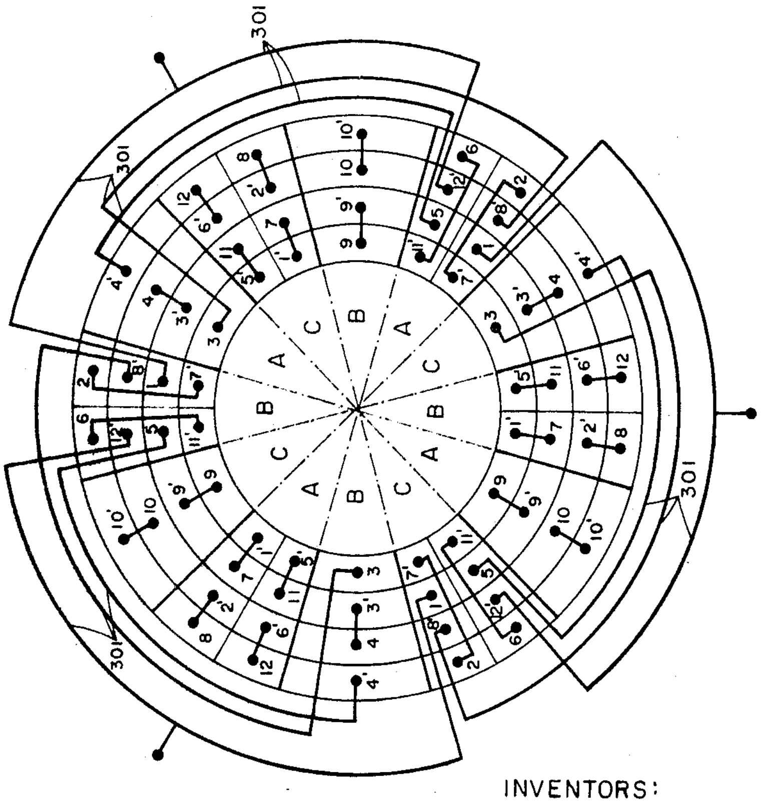

Another winding for a four-pole, two-layer armature is illustrated in FIGS. 31–37. FIG. 31 is a view of section 30 of FIG. 1 showing two layers of bars in the active region of the armature with six bars in each of 12 phase belts. FIG. 32 is a view of section 40 showing the two layers of bars subdivided into four sublayers. Also shown in FIG. 32 by direction arrows 22, is the direction of the helices in region 20. FIG. 33 shows the four sublayers at the section 70, and the direction arrows 22 of the helices in region 21. FIG. 34 shows the bar end connections at section 50, which is the terminal, bastard, end of the winding. FIG. 35 shows the bar end connections at section 80, which is the regular end of the winding. FIG. 36 is the conventional developed representation of the winding of a phase of the winding shown in FIGS. 31–35. FIG. 37 is a complete developed representation of all three phases, A, B and C of the winding.

As is shown in FIGS. 31–37 the electrical sequence of the bars in each phase is: 1—1′–7—7′–2—2′–8—8-′–3–9′ –9–3′–4–10–1′–4′–5—5′–11—11′–6—6′–1-2—12′. This winding requires jumpers 301 to connect nonadjacent bars as shown in FIGS. 34, 36, 37.

This four-pole, three-phase winding has all bars per phase serially connected so that it gives twice the terminal voltage for the same number of bars connected as in FIG. 25.

Where cryogenic field structures are not available or desired, the present invention may also be employed with conventional rotating field structures using an iron core. However, when using the instant invention, no magnetic teeth are to be used in the armature, thereby increasing the reluctance of the magnetic field path which may make it difficult to get very high fields using conventional field structures. Also because of the fact that there are no teeth in the armature, the magnetic flux in sweeping across the armature bars will tend to induce eddy currents in them which effect is reduced by fabricating the bars of insulated strands of wire.

The bar connections to provide the controlled gradient winding according to this invention for a different winding than those previously described should be obvious to those skilled in the art in the light of the specific embodiments which have been presented.

What is claimed is:

1. An armature having a controlled voltage gradient winding comprising a plurality of electrically conductive bars, each bar being serially connected to a bar 180 electrical degrees removed therefrom to form a turn, turns adjacent to each other in the active region of the armature being serially connected to form a phase winding, said adjacent turns being without intervening electrically conductive material constituting the sides of slots in an iron armature, each turn being insulated to withstand substantially only the voltage difference between it and adjacent turns, said voltage difference being determined by the number of serially connected turns between said turn and an immediately adjacent turn and being substantially less than the phase voltage of the machine, said bars being formed into helices near their ends to cause said bars to twist through 90 electrical degrees, said helically twisted bars being connected at their ends to oppositely helically twisted bars to form said serial connection of turns of adjacent bars, additional insulation capable of withstanding the full phase voltage being inserted where the oppositely twisted bars cross each other.

2. The armature winding of claim 1 comprising in addition said bars forming at least two sublayers of bars in each end region of said armature, the bars which are helically twisted in one direction at one end being in one sublayer and those bars which are helically twisted in the opposite direction being in a different sublayer, a bar of one sublayer being serially connected to a bar of a different sublayer to form a turn, adjacent sublayers which are oppositely twisted having said additional insulation in the form of a cylinder therebetween capable of withstanding the full phase voltage.

3. The armature winding of claim 1 comprising in addition a plurality of N of said phase windings, the bars of one phase winding being insulated from the adjacent bars of the adjacent phase winding by no more insulation than that provided on each other bar of the phase windings, said phase windings being connected to a different phase winding at each end to form a balanced N-phase polygon connected armature winding.

4. The armature of claim 3 wherein the plurality of phase windings is three in number and said balanced three-phase winding is delta connected.

5. The armature winding of claim 1 comprising in addition a plurality of N of said phase windings, each phase winding being connected to a common terminal by one end of the phase winding to form a balanced N-phase star-connected armature winding, an insulator capable of withstanding the phase voltage being between adjacent phase windings.

6. The armature winding of claim 5 wherein the plurality of phase windings is three in number and said balanced three-phase winding is wye connected.

7. The armature winding of claim 2 comprising in addition said insulated bars substantially filling the space the active region of the armature.

8. The armature winding of claim 1 comprising in addition a cylinder of insulation within said armature winding on which said winding is supported, a cylinder of insulation outside and surrounding said armature winding, each cylinder of insulation being capable of withstanding the phase voltage potential difference.

9. The armature of claim 8 comprising in addition a cryogenic magnetic field structure located within and capable of rotating about the longitudinal axis of the armature, an electrically conductive cylinder having its axis coincident with the axis of the armature, said conductive cylinder being external to said armature and separated therefrom to provide an eddy current shield to prevent flux from said magnetic field structure and said armature extending beyond said cylinder.

10. The armature of claim 8 comprising in addition a magnetic field structure located within and capable of rotating about the longitudinal axis of the armature, a cylinder of ferromagnetic material having its axis coincident with the axis of the armature, said magnetic cylinder being external to said armature to provide a magnetic return path for the flux produced by said magnetic field structure and said armature.

11. An armature winding comprising 2N phase belts, where N is one or greater, each phase belt comprising "n" electrically conductive bars arranged cylindrically in two layers with the bars of the outermost layer being radially displaced from the bars of the innermost layers, the bars of a first phase belt being consecutively numbered with the outermost bar at one end of the phase belt being designated with the numeral one and the bar radially displaced therefrom being designated with the numeral two, the last bar of the belt being the innermost bar at the other end of the belt which is designated "n", a second phase belt displaced from said first phase belt by 180 electrical degrees, corresponding bars of the first and second phase belts being correspondingly numbered, the bar numbers being primed in the second phase belt to distinguish these bars from those of the first phase belt, said phase belts having a non-terminal end at which the bars of the first and second belts are connected to form turns and a terminal end at which the turns are serially connected to form a phase winding, said 2N phase belts each having their corresponding bars numbered to correspond with each other, alternate belts having primed numbers, said bars being insulated from each other to withstand the voltage difference between adjacent bars, said bars being without intervening electrically conductive material constituting the sides of slots in an iron armature.

12. The armature winding of claim 11 comprising in addition the order of connection of the bars of the two phase belts at the non-terminal end being 1—1', 2—2', - - - , n—n', the order of connection of the bars of the two phase belts at the terminal end being 1'–2, 2'–3, - - - , (n—1)'–n, said connections providing a sequence of connections of the bars in any one phase of 1—1'–2—2'–3—3', - - - , (n—1)-(n—1)'–n—n' to provide a phase winding between the terminal ends of bars 1 and n', said 2N phase belts thereby providing N phase windings, said bars being insulated from each other to withstand substantially three turns of voltage.

13. The armature winding of claim 12 comprising in addition said N phase windings being three in number, said three phase windings being connected to each other at the terminal end of the phase windings to form a delta connected balanced three phase armature winding by connecting terminal one of one phase winding to terminal n' of the adjacent phase winding, the phase belts having no additional insulation other than the said bar insulation between them where they are next to each other.

14. The armature winding of claim 12 comprising in addition said N phase windings between three in number, said three phase windings being connected to each other at the terminal end of the phase windings to form a wye connected balanced three phase armature winding by connecting together terminal n' of each phase winding, the phase belts being separated by insulation capable of withstanding the full phase voltage.

15. The armature winding of claim 11 comprising in addition the order of connection of the bars of the two phase belts at the non-terminal end being 1–2', 1'–2, - - - , (n—1)'–n, the order of connection of the bars of the two phase belts at the terminal end being 1'–4, 2—2', 3—3', 4'–5, - - - , (n—1)-(n—1'), said connections providing a sequence of connection of the bars in any one phase of 1–2'–2–1'–4–3'–3–4'–5, - - - (n—1)–n' to provide a phase winding between the terminal ends of bars 1 and n', said 2N phase belts thereby providing N phase windings, said bars being insulated from each other to withstand substantially three turns of voltage.

16. The armature winding of claim 15 comprising in addition said N phase windings being three in number, said three phase windings being connected to each other at the terminal end of the phase windings to form a delta connected three-phase armature winding by connecting terminal one of one phase winding to terminal n' of the next phase winding.

17. The armature winding of claim 15 comprising in addition said N phase windings being three in number, said three phase windings being connected to each other at the terminal end of the phase windings to form a wye connected balanced three phase armature winding by connecting together terminal n' of each phase winding, the phase belts being separated by insulation capable of withstanding the full phase voltage.

18. The armature winding of claim 11 comprising in addition the order of connection of the bars of the two phase belts at the non-terminal end being 1–3′, 1′–3, 2–4′, 2′–4, - - - (*n*–2)′–*N*, the order of connection of the bars of the two phase belts at the terminal end being 1′–4, 2–3′, 3–4′, 2′–5, - - - , (*n*–1)–*n*′, said connections providing a sequence of connection of the bars in any one phase of 1–3′–2–4′–3–1-′–4–2′–5 - - - *N*–(*n*–2)′ to provide a phase winding between the connected terminal ends of bars 1 and (*n*–2)′, said 2N phase belts thereby providing N phase windings,, said bars being insulated from each other to withstand substantially six turns of voltage.

19. The armature winding of claim 18 comprising in addition said N phase windings being three in number, said three phase windings being connected to each other at the temminal end of the phase windings to form a delta connected three-phase armature winding by connecting terminal one of one phase winding to terminal (*n*–2)′ of the next phase winding.

20. The armature winding of claim 18 comprising in addition said N phase windings being three in number, said three phase windings being cnnnected to each other at the terminal end of the phase windings to form a wye connected balanced three phase armature winding by connecting together terminal (*n*–2)′ of each phase winding, the phase belts being separated by insulation capable of withstanding the full phase voltage.

21. The armature winding of claim 11 comprising in addition the order of connection of the bars of the two phase belts at the non-terminal end being 1–2′, 2–1′, 3–4′, 4–3′, - - - , *n*–(*n*–1)′, the order of connection of the bars of the two phase belts at the terminal end being 1′–4, 2′–3, 2–4′, 3′–5, - - - , (*n*–2)–*n*′, said connections providing a sequence of connection of the bars in any one phase of 1–2′–3–4′–2–1-′–4–3′ - - - *n*–(*n*–1)′ to provide a phase winding between the connected terminal ends of bars 1 and (*n*–1)′, said 2N phase belts thereby providing N phase windings, said bars being insulated from each other to withstand substantialy four turns of voltage.

22. The armature windng of claim 21 comprising in addition said N phase windings being three in number, said three phase windngs being connected to each other at the terminal end of the phase windings to form a delta connected three phase armature winding by connecting terminal one of one phase winding to terminal (*n*–1)′ of the next phase winding.

23. The armature winding of claim 21 comprising in addition said N phase windings being three in number, said three phase windings being connected to each other at the terminal end of the phase windings to form a wye connected balanced three phase armature winding by connecting together terminal (*n*–1)′ of each phase winding, the phase belts being separated by insulation capable of withstanding the full phase voltage.

24. A winding for four-pole armature comprising an armature having two layers of electrically conductive bars in the active region of the armature arranged to provide 12 phase belts, said bars arranged to form an outermost layer of bars radially displaced from the bars of the innermost layers, the bars of a first phase A all being adjacent to each other and consecutively numbered with the innermost bar at one end of the phase belt being designated with the numeral one and the bar radially displaced outwardly therefrom being dsignated with the numeral two, the last bar of the belt being the outermost bar at the other end of the belt designated "*n*,"

a second phase belt A′ displaced from said first phase belt A by 180 electrical degrees, the corresponding bars of the second phase belt being designated with primed numerals in the same order as said first phase belt bars, a third and fourth phase belt corresponding to said first and second phase belts, respectively, and displaced therefrom by 180 mechanical degress with bars corresponding to 1 to *n* being designated by the unprimed and primed numerals (*n*+1) to 2n, respectively, the electrical sequence of connection of the serially connected bars of the four phase belts being 1–2-′–(n+1)–(n+2)′ - - - (2*n*-1)–(2*n*)′ connected in parallel with the serially connected bars 2–(*n*+1-)′–(*n*+2)–1′–, - - - , –n–(2*n*–1)′–2n–(*n*–1)′, said connections providing a phase winding between the ends pf bars 1 and (2*n*)′, the remaining eight of said 12 phase belts being likewise connected to each other to form two other phase windings, the three phase windings having correspondingly numbered bar 1 and (2*n*)′ ends 120 electrical degrees out of phase with each other, said bars being insulated from each other to withstand substantially three turns of voltage.

25. The armature winding of claim 24 comprising in addition said three phase windings being connected to each other to form a delta connected balanced three phase armature winding by connecting terminal one of one phase winding to terminal (2*n*)′ of the next phase winding.

26. A controlled voltage gradient armature winding for a two-pole machine comprising an armature having electrically conductive bars in the active region of the armature arranged to provide six phase belts, the bars of a first phase belt A being consecutively numbered with the endmost bar at one end of the phase belt being designated with the numeral one and the endmost bar at the other end of the phase belt being designated "*n*,"

a second phase belt A′ displaced from said first phase belt A by 180 electrical degrees, the corresponding bars of the second phase belt being designated with primed numerals in the same order as said first phase belt bars, the electrical sequence of connections of the serially connected bars of the first and second phase belts being 1′–2–3′–4 - - - (n–1)′–n connected in parallel with the serial connection of bars 2′–1–4′–3–n-′–(n–1), said connections providing a phase winding between the ends of bars 1′ and n, the remaining four of said six phase belts being likewise connected to each other to form two other phase windings, the three phase windings having correspondingly numbered bars 1′ and n 120 electrical degrees out of phase with each other, said bars being insulated from each other to withstand substantially two turns of voltage.

27. The armature winding of claim 26 comprising in addition said three phase windings being connected to each other to form a delta connected three phase armature winding by connecting terminal 1′ of one phase winding to terminal n of a different phase winding.

28. A controlled voltage gradient armature winding for a four pole machine comprising an armature having two layers of electrically conductive bars in the active region of the armature arranged to provide twelve phase belts, said bars arranged to form an outermost layer of bars radially displaced from the bars of the innermost layers, the bars of a first phase belt A being consecutively numbered with the innermost bar at one end of the phase belt being designated with the numeral one and the bar radially displaced outwardly therefrom being designated with the numeral two, the last bar of the belt being the outermost bar at the other end of the belt designated "n,"

a second phase belt A′ displaced from said first phase belt A by 180 electrical degrees, the corresponding bars of the second phase belt being designated with primed numerals in the same ordr as said first phase belt bars, a third and fourth phase belts corresponding to said first and second phase belts, respectively, and displaced therefrom by 180 mechanical degrees with corresponding bars being designated by the unprimed and primed numerals (n+1) to 2n, respectively, the electrical sequence of connection of the serially connected bars in the four phase belts being 1—1-′–(n+1)–(n+1)′–2–2′–(n+2)–(n+2)′ - - - (2n–1)–(2n–1)′–n–n′–2n–(2n)′, said connections providing a phase winding between the ends of bars 1 and (2n)′, the remaining eight of said 12 phase belts being likewise connected to each other to form two other phase windings, the three phase windings having correspondingly numbered bar 1 and (2n)′ ends 120 electrical degrees out of phase with each other, said bars being insulated from each other to withstand substantially two turns of voltage.

29. The armature winding of claim 28 comprising in addition said three phase windings being connected to each other to form a delta connected three phase armature winding by connecting terminal one of one phase winding to terminal (2n)′ of the next phase winding.

* * * * *